United States Patent
Kim et al.

(10) Patent No.: US 9,718,491 B2
(45) Date of Patent: Aug. 1, 2017

(54) STEERING APPARATUS FOR VEHICLE

(71) Applicant: HYUNDAI MOBIS CO., LTD., Seoul (KR)

(72) Inventors: Tae Yoon Kim, Yongin-si (KR); Byeong Hoon Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/007,068

(22) Filed: Jan. 26, 2016

(65) Prior Publication Data

US 2016/0257334 A1 Sep. 8, 2016

(30) Foreign Application Priority Data

Mar. 2, 2015 (KR) .......................... 10-2015-0029061

(51) Int. Cl.
*B62D 3/12* (2006.01)
*B62D 21/11* (2006.01)

(52) U.S. Cl.
CPC ................ *B62D 3/12* (2013.01); *B62D 21/11* (2013.01)

(58) Field of Classification Search
CPC .................................. B62D 3/12; B62D 21/11
See application file for complete search history.

(56) References Cited

U.S. PATENT DOCUMENTS

| | | | | |
|---|---|---|---|---|
| 4,314,710 A | * | 2/1982 | Kamoshita | B62D 3/12 280/93.515 |
| 5,099,714 A | * | 3/1992 | Hutchison | B62D 3/12 74/422 |
| 5,597,049 A | * | 1/1997 | Bruehl | B62D 3/123 180/400 |
| 5,997,038 A | * | 12/1999 | Dostert | B60G 3/24 180/312 |
| 6,102,416 A | * | 8/2000 | Harkrader | B62D 3/12 280/771 |
| 6,164,405 A | * | 12/2000 | Sakata | B60G 3/24 180/400 |
| 6,397,701 B1 | * | 6/2002 | Park | B62D 3/12 280/775 |
| 6,425,592 B1 | * | 7/2002 | Lee | B62D 3/12 280/124.109 |
| 6,722,465 B2 | * | 4/2004 | Ballester | B62D 3/12 180/428 |
| 7,481,401 B2 | * | 1/2009 | Hyslop | B62D 3/12 180/428 |

(Continued)

FOREIGN PATENT DOCUMENTS

| | | | | |
|---|---|---|---|---|
| EP | 347059 A2 | * | 12/1989 | |
| GB | 2036672 A | * | 7/1980 | .............. B62D 3/12 |
| JP | 63106175 A | * | 5/1988 | |

(Continued)

*Primary Examiner* — Laura Freedman
(74) *Attorney, Agent, or Firm* — Knobbe Martens Olson & Bear LLP

(57) ABSTRACT

A steering apparatus for a vehicle may include: a pinion gear rotated in connection with a steering wheel; a rack housing for housing a rack bar which is rotated while engaged with the pinion gear; and a mounting member coupled to the rack housing, wherein the mounting member may be coupled to a subframe while the shape thereof is changed according to the position or shape of the subframe.

8 Claims, 5 Drawing Sheets

(56) References Cited

U.S. PATENT DOCUMENTS 8,523,206 B2 * 9/2013 Degenstein .............. B62D 3/12
180/428

FOREIGN PATENT DOCUMENTS

| JP | 06135338 A | * | 5/1994 |
| JP | 09290761 A | * | 11/1997 |
| JP | 10338163 A | * | 12/1998 |
| JP | 2002178936 A | * | 6/2002 |
| JP | 2004268777 A | * | 9/2004 |
| KR | 2011037572 A | * | 4/2011 |
| KR | 2011038287 A | * | 4/2011 |
| KR | 10-2013-0040104 A | | 4/2013 |

\* cited by examiner (A)

(B)

STEERING APPARATUS FOR VEHICLE

CROSS-REFERENCES TO RELATED APPLICATIONS

The present application claims priority to Korean application number 10-2015-0029061, filed on Mar. 2, 2015, which is incorporated by reference in its entirety.

BACKGROUND

The present disclosure relates to a steering apparatus for a vehicle, and more particularly, a steering apparatus for a vehicle, which is coupled to a subframe and transfers a driver's steering wheel operation to a wheel.

A steering force of a vehicle through a steering wheel is transferred to a wheel through a steering apparatus having a rack-pinion structure, and then rotates the wheel. In particular, a motor driven steering apparatus for a vehicle assists a steering force through a motor, and enables a driver to more easily operate the steering wheel.

The related technology is disclosed in Korean Patent Laid-open Publication No. 10-2013-0040104 published on Apr. 23, 2013 and titled "Rack bush of steering apparatus for vehicle").

SUMMARY

Embodiments of the present invention are directed to a steering apparatus for a vehicle, which is capable of stably coupling a rack housing to a subframe and preventing the damage and deformation of the rack housing, thereby preventing noise, vibration, and bad steering feel.

In one embodiment, a steering apparatus for a vehicle may include: a pinion gear rotated in connection with a steering wheel; a rack housing for housing a rack bar which is rotated while engaged with the pinion gear; and a mounting member coupled to the rack housing, wherein the mounting member may be coupled to a subframe while the shape thereof is changed according to the position or shape of the subframe.

The mounting member may include: a mounting part coupled to the rack housing; a sub mounting part interposed between the mounting part and the subframe and rotatably coupled to the mounting part; and a fastening part coupling the mounting part and the sub mounting part to the subframe.

The fastening part may include: a fastening part body coupled to the subframe through the mounting part and the sub mounting part; and a fastening part head coupled to the fastening part body, having a larger diameter than the fastening part body, and pressurizing the mounting part toward the sub mounting part.

The fastening part body may be screwed to the subframe through a screw thread formed on the outer circumferential surface thereof.

The fastening part body and the fastening part head may be integrated with each other.

The mounting part may protrude from the rack housing and include a mounting hole through which the fastening part is passed and a sub mounting seating part formed on the bottom surface thereof and having a shape corresponding to the shape of the sub mounting part, and the sub mounting part may be seated on the sub mounting seating part.

The sub mounting seating part may be formed in a concave shape so as to be in surface contact with the sub mounting part.

The sub mounting part may be interposed between the mounting part and the subframe, and has a sub mounting hole through which the fastening part is passed.

The inner diameter of the sub mounting hole may be larger than the diameter of the fastening part.

The inner diameter of the sub mounting hole may be larger than the diameter of the mounting hole.

The surface of the sub mounting part, facing the mounting part, may be formed in a convex shape and contacted with the sub mounting seating part.

The sub mounting part may be formed in a hemispherical shape, and has a convex surface contacted with the sub mounting seating part.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Typically, in a vehicle, a rack housing is coupled to a subframe of the vehicle. The manufacturing process for the subframe has a characteristic that it is difficult to precisely control the level and angle of a mounting part. Thus, the rack housing coupled to the subframe may be bent or damaged, which may cause steering errors, defects and noise.

Figure 1:
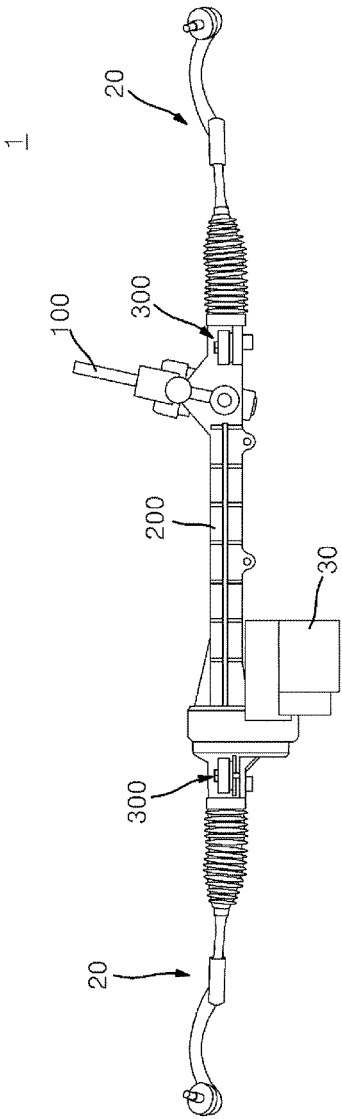
FIG. 1 is a schematic perspective view of a steering apparatus for a vehicle in accordance with an embodiment of the present invention.

FIG. 1 is a schematic perspective view of a steering apparatus for a vehicle in accordance with an embodiment of the present invention. Referring to FIG. 1, the steering apparatus 1 for a vehicle in accordance with the embodiment of the present invention may include a pinion gear 100, a rack housing 200, and a mounting member 300.

The pinion gear 100 is rotated in connection with a steering wheel, and moves a rack bar housed in the rack housing 200 in the side-to-side direction based on FIG. 1. The rack bar may have a tie rod end 20 formed at either end thereof. The tie rod end 20 may connect the rack bar to a wheel. As the rack bar is moved, the wheel may be rotated to steer the vehicle.

In the present embodiment, the steering apparatus 1 may further include a motor unit 30 for assisting the operation force of the pinion gear 100. The motor unit 30 may be coupled to the rack housing 200 through bolting or welding, and convert power applied from outside into a rotational force to rotate the rack bar.

The rack bar which is rotated while engaged with the pinion gear 100 may be housed in the rack housing 200. In the present embodiment, the rack housing 200 may include a metallic material, and have a cylindrical shape which is elongated in the longitudinal direction (the side-to-side direction of FIG. 1).

Figure 2:
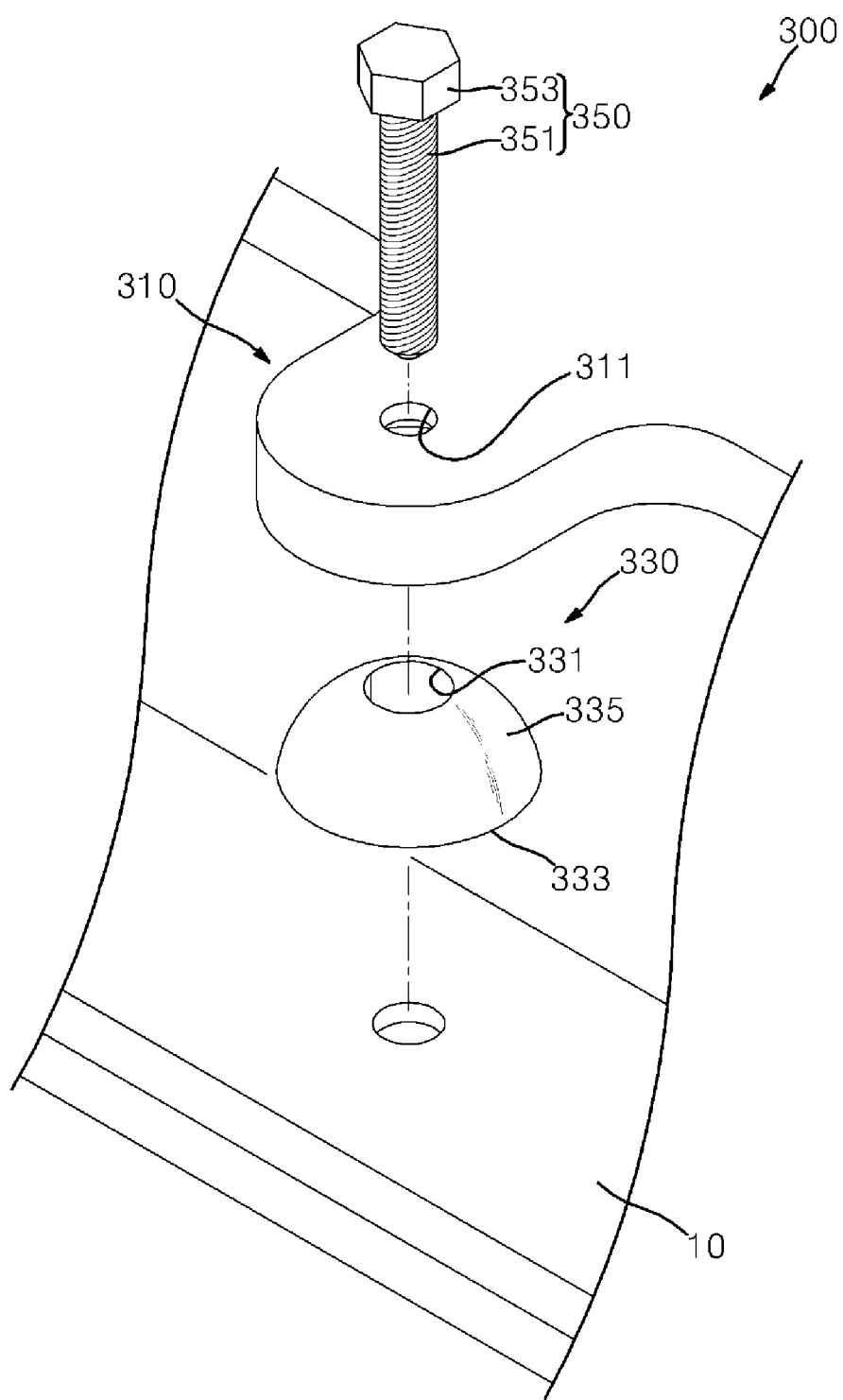
FIG. 2 is a schematic perspective view illustrating a mounting member and a subframe in the steering apparatus for a vehicle in accordance with the embodiment of the present invention.
Figure 3:
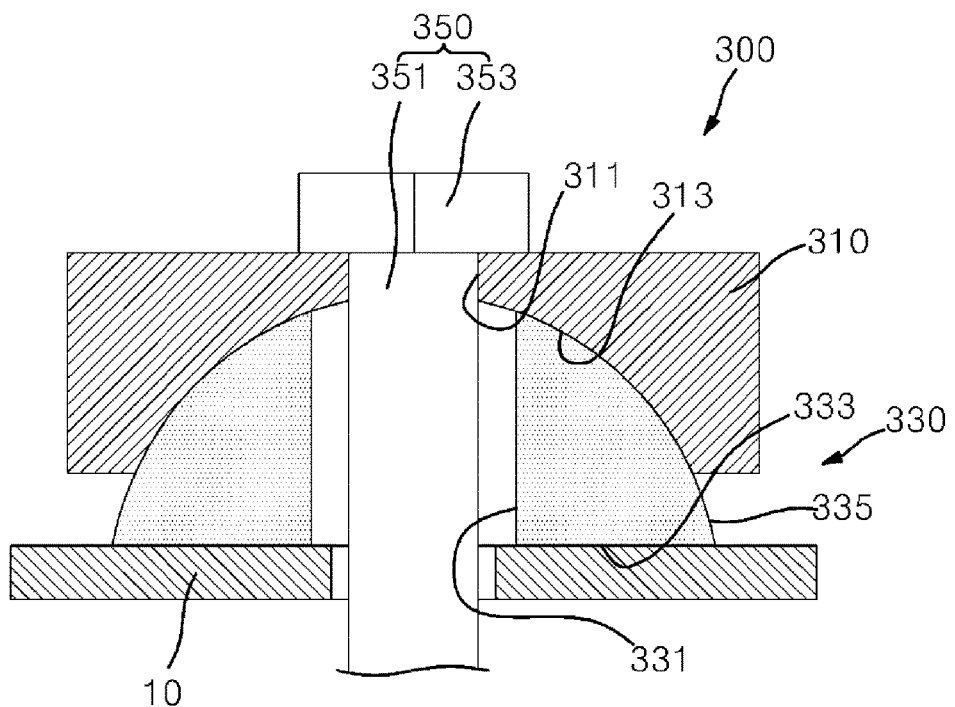
FIG. 3 is a cross-sectional view illustrating a state in which the mounting member and the subframe are coupled to each other in the steering apparatus for a vehicle in accordance with the embodiment of the present invention.
Figure 4:
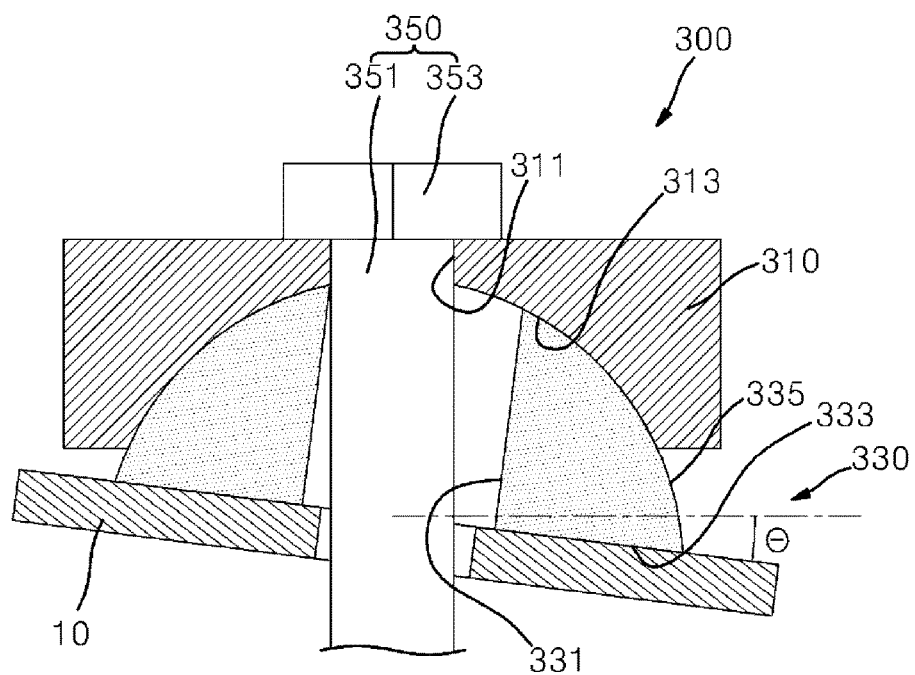
FIG. 4 is a cross-sectional view illustrating a state in which a sub mounting part is rotated according to the tilted subframe in the steering apparatus for a vehicle in accordance with the embodiment of the present invention.

FIG. 2 is a schematic perspective view illustrating a mounting member and a subframe in the steering apparatus for a vehicle in accordance with the embodiment of the present invention. FIG. 3 is a cross-sectional view illustrating a state in which the mounting member and the subframe are coupled to each other in the steering apparatus for a vehicle in accordance with the embodiment of the present invention. FIG. 4 is a cross-sectional view illustrating a state in which a sub mounting part is rotated according to the tilted subframe in the steering apparatus for a vehicle in accordance with the embodiment of the present invention.

Referring to FIGS. 2 to 4, the mounting member 300 may be coupled to the rack housing 200. According to the position of the subframe 10 of the vehicle, the shape of the mounting member 300 may be varied. Then, the mounting member 300 may be coupled to the subframe 10 while maintaining the contact with the subframe 10. In the present embodiment, the mounting member 300 may include a mounting part 310, a sub mounting part 330, and a fastening part 350.

The mounting part 310 may be coupled to the rack housing 200. In the present embodiment, the mounting part 310 may protrude from the rack housing 200, and have a mounting hole 311 through which the fastening part 350 is passed. Furthermore, a sub mounting seating part 313 having a concave shape corresponding to the shape of the sub mounting part 330 may be formed on the bottom surface of the mounting part 310, and the sub mounting part 330 may be rotatably seated on the sub mounting seating part 313.

The sub mounting part 330 may be interposed between the mounting part 310 and the subframe 10, and rotatably coupled to the mounting part 310. In the present embodiment, the sub mounting part 330 may be interposed between the mounting part 310 and the subframe 10, and have a sub mounting hole 331 through which the fastening part 350 is passed.

In the present embodiment, the sub mounting hole 331 may have a larger diameter than the mounting hole 311 and the fastening part 350 such that the sub mounting part 330 can be rotated without interference with the fastening part 350 even in a state where the fastening part 350 is inserted into the sub mounting hole 331.

In the present embodiment, the sub mounting part 330 may be formed in a hemispherical shape. In embodiments, the sub mounting part 330 may have a flat bottom surface contacted with the subframe 10 and a convex surface 335 contacted with the sub mounting seating part 313. The bottom surface may be referred to as a sub mounting bottom surface 333.

The fastening part 350 may couple the mounting part 310 and the sub mounting part 330 to the subframe 10 while being coupled to the subframe 10 through the mounting part 310 and the sub mounting part 330. In the present embodiment, the fastening part 350 may include a fastening part body 351 and a fastening part head 353.

The fastening part body 351 may be passed through the mounting hole 311, the sub mounting hole 331, and the subframe 10, and coupled to the subframe 10 through a screw thread formed on the outer circumferential surface thereof. The fastening part head 353 having a larger diameter than the fastening part body 351 may be formed at one end of the fastening part body 351. When the fastening part body 351 is coupled to the subframe 10 through the mounting part 310 and the sub mounting part 330, the fastening part head 354 may press and fix the mounting part 310 and the sub mounting part 330 to the subframe 10.

Figure 5:
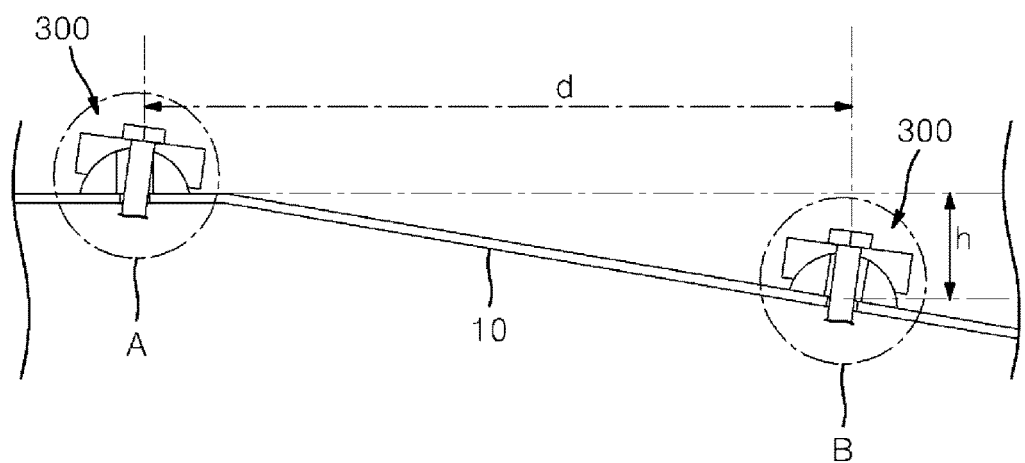
FIG. 5 is a diagram illustrating a state in which a plurality of mounting members are coupled to the subframe in the steering apparatus for a vehicle in accordance with the embodiment of the present invention.
Figure 6:
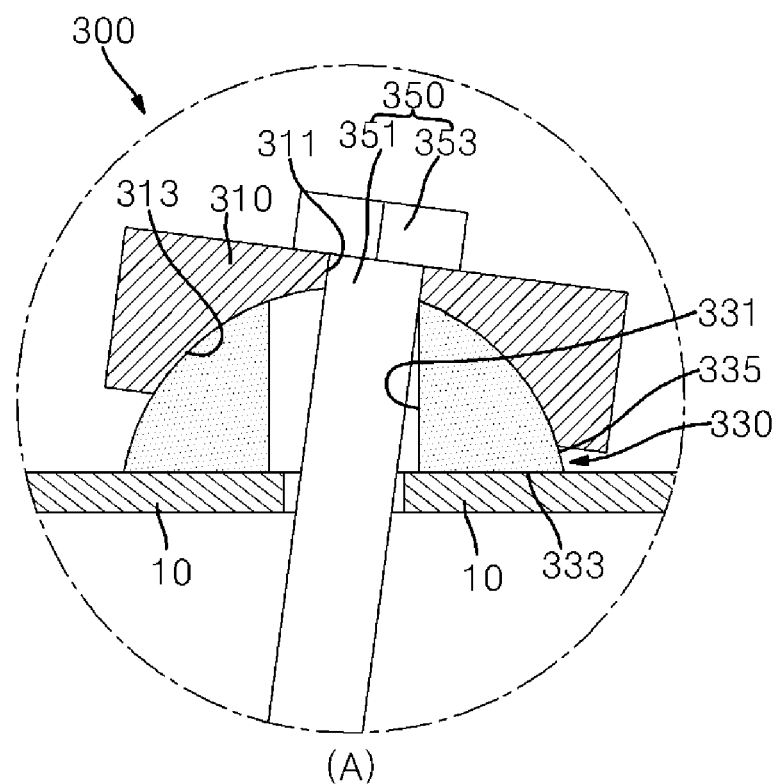
FIG. 6 is an expanded view of portions A and B in FIG. 5.
Figure 6:
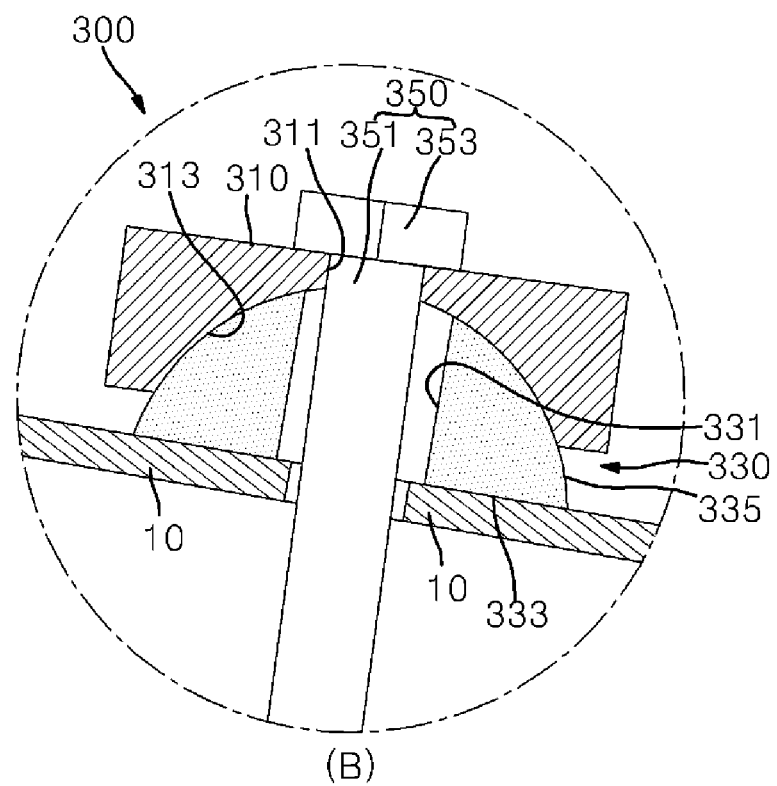

FIG. 5 is a diagram illustrating a state in which a plurality of mounting members are coupled to the subframe in the steering apparatus for a vehicle in accordance with the embodiment of the present invention. FIG. 6 is an expanded view of portions A and B in FIG. 5.

Referring to FIGS. 1, 5, and 6, the operation principle and effect of the steering apparatus 1 for a vehicle in accordance with the embodiment of the present invention will be described as follow.

The rack housing 200 may be coupled to the subframe 10 through the mounting member 300. In embodiments, the mounting part 310 and the sub mounting part 330 may be coupled to the subframe 10 through the fastening part 350 in a state where the sub mounting part 330 is positioned between the mounting part 310 and the subframe 10 such that the sub mounting bottom surface 333 is contacted with the subframe 10.

However, while the subframe 10 is manufactured through a press process and a welding process, the position and shape of the mounting part 310 may be changed.

In the steering apparatus 1 for a vehicle in accordance with the present embodiment, the sub mounting part 330 may be rotatably coupled to the mounting part 310 in a state where the sub mounting part 330 is contacted with the subframe 10. Thus, even when the subframe 10 is tilted or a level difference occurs, the position of the rack housing 200 may be moved or the sub mounting part 330 may be rotated, in order to stably couple the sub mounting part 330 to the subframe 10.

Thus, the rack housing 200 may be stably supported by the mounting member 300 and the subframe 10. While the rack housing 200 is coupled to the subframe 10, an excessive load may be prevented from being applied to the mounting part 310 and the rack housing 200, which makes it possible to reduce the damage of the apparatus and the occurrence of noise.

Furthermore, since the sub mounting part 330 is rotatably coupled to the mounting part 310 and contacted with the subframe 10, the sub mounting part 330 may stably couple the rack housing 200 to the subframe 10 while maintaining the contact with the subframe 10.

Furthermore, the sub mounting part 330 may be rotated according to the shape of the subframe 10, thereby preventing the bending of the rack housing 200, preventing the damage of the apparatus and the occurrence of noise, and improving the steering feel.

Furthermore, since the sub mounting hole 331 formed in the sub mounting part 330 has a larger diameter than the mounting hole 311 and the fastening part 350, the rotation of the sub mounting part 330 may be increased to smoothly maintain the contact with the subframe 10.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A steering apparatus for use in a vehicle, the apparatus comprising:
   a pinion gear configured to rotate according to operation of a steering wheel;
   a rack housing configured to house a rack bar that is operably engaged with the pinion gear; and
   a mounting member coupled to the rack housing, wherein the mounting member is coupled to a subframe while a configuration of the mounting member changes,
   wherein the mounting member comprises:
      a mounting coupled to the rack housing,
      a sub-mounting part interposed between the mounting part and the subframe and rotatably coupled to the mounting part, and
      a fastening part coupling the mounting part and the sub-mounting part to the subframe,
   wherein the mounting part protrudes from the rack housing and includes a mounting hole through which the fastening part is passed and a sub-mounting seating part formed on a bottom surface thereof and having a shape corresponding to the shape of the sub-mounting part, and the sub-mounting part is seated on the sub-mounting seating part,
   wherein the sub-mounting part is interposed between the mounting part and the subframe, and has a sub-mounting hole through which the fastening part is passed.

2. The steering apparatus of claim 1, wherein the fastening part comprises:
   a fastening part body coupled to the subframe through the mounting part and the sub mounting part; and
   a fastening part head coupled to the fastening part body, having a larger diameter than the fastening part body, and pressurizing the mounting part toward the sub mounting part.

3. The steering apparatus of claim 2, wherein the fastening part body is screwed to the subframe through a screw thread formed on an outer circumferential surface of the fastening part body.

4. The steering apparatus of claim 2, wherein the fastening part body and the fastening part head are integrated with each other.

5. The steering apparatus of claim 1, wherein the inner diameter of the sub-mounting hole is larger than the diameter of the fastening part.

6. The steering apparatus of claim 1, wherein the inner diameter of the sub-mounting hole is larger than the diameter of the mounting hole.

7. The steering apparatus of claim 1, wherein a surface of the sub-mounting part, facing the mounting part, is formed in a convex shape and contacted with the sub-mounting seating part.

8. The steering apparatus of claim 1, wherein the sub-mounting part is formed in a hemispherical shape, and has a convex surface contacted with the sub-mounting seating part.

* * * * *